Patented Apr. 27, 1926.

1,582,328

UNITED STATES PATENT OFFICE.

WILLIAM A. ADAMSON, OF WILMINGTON, DELAWARE, AND PAUL W. CARLETON, OF PENNS GROVE, NEW JERSEY, ASSIGNORS TO E. I. DU PONT DE NEMOURS & COMPANY, OF WILMINGTON, DELAWARE, A CORPORATION OF DELAWARE.

RECOVERY OF ANTIMONY IN THE MANUFACTURE OF FLAVANTHRONE.

No Drawing.    Application filed February 29, 1924. Serial No. 696,069.

*To all whom it may concern:*

Be it known that we, WILLIAM A. ADAMSON and PAUL W. CARLETON, citizens of the United States, and residents of Wilmington, county of New Castle, State of Delaware, and Penns Grove, county of Salem, State of New Jersey, respectively, have invented a certain new and useful Recovery of Antimony in the Manufacture of Flavanthrone, of which the following is a specification.

This invention relates to the recovery of the antimony which, in combination with chlorine, is ordinarily used in the production of flavanthrone from beta-amino-anthraquinone.

The method generally used for the manufacture of flavanthrone consists in boiling beta-amino-anthraquinone with antimony pentachloride in nitrobenzene solution. While the recovery of the solvent used in such an operation is not uncommon, a method of recovering the antimony has not heretofore been devised. The chief object of our invention is to provide a process for recovering the antimony present, together with the nitrobenzene, and converting the antimony to a form suitable for re-use as a condensing agent in the same manufacture.

The improved method consists essentially in the distillation under vacuum of the filtrate resulting from the removal of the color from the condensation charge, the estimation of the amount of antimony present in the distillate, and the addition to the distillate of sufficient dry chlorine gas to convert all of the antimony present to the penta-valent form, i. e., to antimony pentachloride. There is thus obtained a mixture of nitrobenzene and antimony pentachloride the full value of which can be utilized in the preparation of succeeding condensation charges. Since in the vacuum distillation only about 80 percent of the nitrobenzene and 80–85 percent of the antimony used are recovered, the process is not wholly cyclic in practice but requires only the addition of small amounts of fresh nitrobenzene and fresh antimony trichloride or pentachloride in the making up of successive charges. In fact, it is possible to use the chlorinated mixture directly for the condensation of the beta-amino-anthraquinone without any additions, although an accurate adjustment of the proportion of materials is necessary for the best yield of color.

Although the above mentioned solution is used as if it were a solution of antimony trichloride in nitrobenzene, the solution actually contains a variable amount of chlorinated nitrobenzene.

The following example will serve to illustrate the nature of the process:

One thousand parts of filtrate from the flavanthrone preparation are distilled under vacuum and the resulting distillate, amounting to 932 grams is analyzed to determine the amount of antimony trichloride present. To the distillate there is then added at a temperature not exceeding 50° C. the theoretical amount of chlorine necessary to convert all of the antimony present to antimony pentachloride. In a specific case 920 parts of the distillate containing 16.8 percent of antimony tri-chloride required the addition of 52 parts of chlorine. The resulting mixture is then used, with proper adjustment of the proportion of antimony pentachloride to nitrobenzene, for the condensation of beta-amino-anthraquinone with results equal to those obtained from the use of fresh nitrobenzene and fresh antimony pentachloride when used under the same conditions.

The invention is not, of course, limited to the specific conditions and proportions given in the above example, since the conditions of the process may be varied considerably without departing from the scope of our invention.

We claim:

1. The process of recovering from the filtrate containing antimony trichloride and nitrobenzene occurring in the manufacture of flavanthrone, the antimony in a form suitable for reuse in said manufacture of flavanthrone, which comprises distilling said filtrate so as to produce a distillate containing the major portions of the antimony trichloride and nitrobenzene as well as some chloro-nitro-benzene, and adding to said distillate sufficient chlorine to convert the antimony trichloride present into antimony pentachloride.

2. A process as set forth in claim 1 in which the amount of antimony in the distillate in the form of trichloride is determined, and sufficient dry chlorine gas is added to convert the antimony present into antimony pentachloride.

3. A process as set forth in claim 1 in which the nitrobenzene solution of antimony trichloride is maintained at a temperature below 50° C. during the treatment with chlorine.

4. A process as set forth in claim 1 in which the amount of antimony in the distillate in the form of trichloride is determined, sufficient dry chlorine gas is added to said distillate to convert the antimony present into antimony pentachloride, and the nitrobenzene solution of antimony trichloride is maintained at a temperature below 50° C. during the treatment with chlorine.

In testimony whereof we affix our signatures.

WILLIAM A. ADAMSON.
PAUL W. CARLETON.